United States Patent [19]

Flading et al.

[11] Patent Number: 4,968,172
[45] Date of Patent: Nov. 6, 1990

[54] WEDGED, OVERLAPPING HOOK TIRE JOINT

[75] Inventors: Donald P. Flading, Pomona; Jerry J. Rogers, Corona, both of Calif.

[73] Assignee: Westinghouse Electric Corp., Pittsburgh, Pa.

[21] Appl. No.: 304,617

[22] Filed: Jan. 1, 1989

[51] Int. Cl.$^5$ .......................... F16B 1/00; F16D 1/00
[52] U.S. Cl. ........................ 403/24; 403/339; 403/340
[58] Field of Search .......... 403/339, 340, 24; 152/308, 316, 335.1

[56] References Cited

U.S. PATENT DOCUMENTS

| 183,855 | 10/1876 | Kendall | 403/340 |
| 466,883 | 1/1892 | Bachem | 403/340 |
| 601,925 | 4/1898 | Wiser | 403/340 |

FOREIGN PATENT DOCUMENTS 2722425  11/1977  Fed. Rep. of Germany ...... 403/294

OTHER PUBLICATIONS

The Carpenters and Joiners Assistant publication 1860 featuring "Joints", FIGS. 3 and 7.

*Primary Examiner*—Andrew V. Kundrat

[57] ABSTRACT

A tire joint apparatus (17) for assembling two sections (11,12) of a rotary combustor tire (10), where each section is provided with a hooked end portion (22, 25). The hooked end portion (25) of one tire section (12) is provided with a tapered surface (30). Upon assembly, the two hooked portions (22,25) are positioned in an overlapping arrangement and a wedge-shaped insert (29) is placed between the hooked end portions (22,25). The wedge-shaped insert (29) is provided with a tapped hole (39,40) at each end in which a wedge retainer or extractor (41) may be attached. Each hooked end portion (22,25) is connected together with two rows of bolts (34,36). A dowel (37,38) is inserted into an aperture (35,36) provided at each interface between the two sections (11,12) to insure precise alignment of the rolling surfaces (13,14) and the thrust surfaces (15,16).

15 Claims, 2 Drawing Sheets

WEDGED, OVERLAPPING HOOK TIRE JOINT

BACKGROUND OF THE INVENTION

1. Field of the Invention.

The present invention is directed to a joint for connecting two sections of a tire, and more particularly, to a wedged overlapping hook joint for connecting together two tire sections of a rotary combustor tire.

2. Related Art.

Due to their large sizes, tires used for rotary combustors have posed difficulties in regard to storage and shipping. Rotary combustors having diameters of 400 cm or larger generally employ large tires which are manufactured in half sections and which are separated for shipping and storage. Prior to use, the half sections are connected together to form a large circular shaped tire. Previous joint designs for connecting the tire half sections have presented various problems. For example, such known designs have a high tendency to wear due to shear and tension effects and such known designs are difficult to manufacture and assemble.

Many known tire joint designs employ shoulder bolts. Shoulder bolts, however, tend to exhibit excessive wear under high tension conditions. Furthermore, shoulder bolts require precise machining of a shoulder pilot hole and a tapped hole at the bottom of the shoulder pilot hole. In order to accomplish the precise machining of the tapped hole at the bottom of the shoulder pilot hole, clearances are generally required to be made in the shoulder pilot hole. Such clearances preclude the ability to precisely align the shoulder bolt. Moreover, the shoulder bolt design provides a joint which is relatively difficult to disassemble and reassemble.

SUMMARY OF THE INVENTION

An object of the present invention is to provide a tire joint assembly, for a rotary combustor tire, which exhibits good tension handling characteristics.

It is also an object of the present invention to provide a tire joint assembly, for a rotary combustor tire, which exhibits good wear resistance characteristics.

It is further an object of the present invention to provide a tire joint assembly, for a rotary combustor tire, which is relatively easy to disassemble and reassemble.

It is yet another object of the present invention to provide a tire joint assembly, for joining sections of a rotary combustor tire, which maintains precise alignment of the rolling and thrust surfaces of the tire sections.

These and other objects are accomplished according to the present invention by providing a tire joint apparatus for assembling two sections of a rotary combustor tire, where each section is provided with a hooked end portion. The hooked end portion of one tire section is provided with a tapered surface. Upon assembly, the two hooked end portions are positioned in an overlapping arrangement and form a wedge-shaped gap therebetween. A dowel is used at the interface of each tire section and the hooked end portion of the other tire section to insure precise alignment of the rolling and thrust surfaces. A wedge-shaped insert is fitted within the wedge-shaped gap formed between the two hooked end portions so that tension and compressive loads provided on the tire are transferred through the insert. The hooked end portions are connected together by two rows of bolts.

As a result, a rigid tire joint is formed. The joint is easy to assemble and disassemble and, by virtue of the alignment dowels, insures precise alignment of the rolling and thrust surfaces of the tire sections upon each assembly. Tension and compressive loads exerted on the assembled tire are efficiently transferred through the wedge-shaped insert.

BRIEF DESCRIPTION OF THE DRAWINGS

The detailed description of the invention will be made with reference to the accompanying drawings, wherein like numeral designate corresponding parts in the several figures.

DESCRIPTION OF THE PREFERRED EMBODIMENTS

The following detailed description is of the best presently contemplated mode of carrying out the invention. This description is not to be taken in a limiting sense but is made merely for the purpose of illustrating the general principles of the invention. The scope of the invention is best defined by the appended claims.

Figure 1:
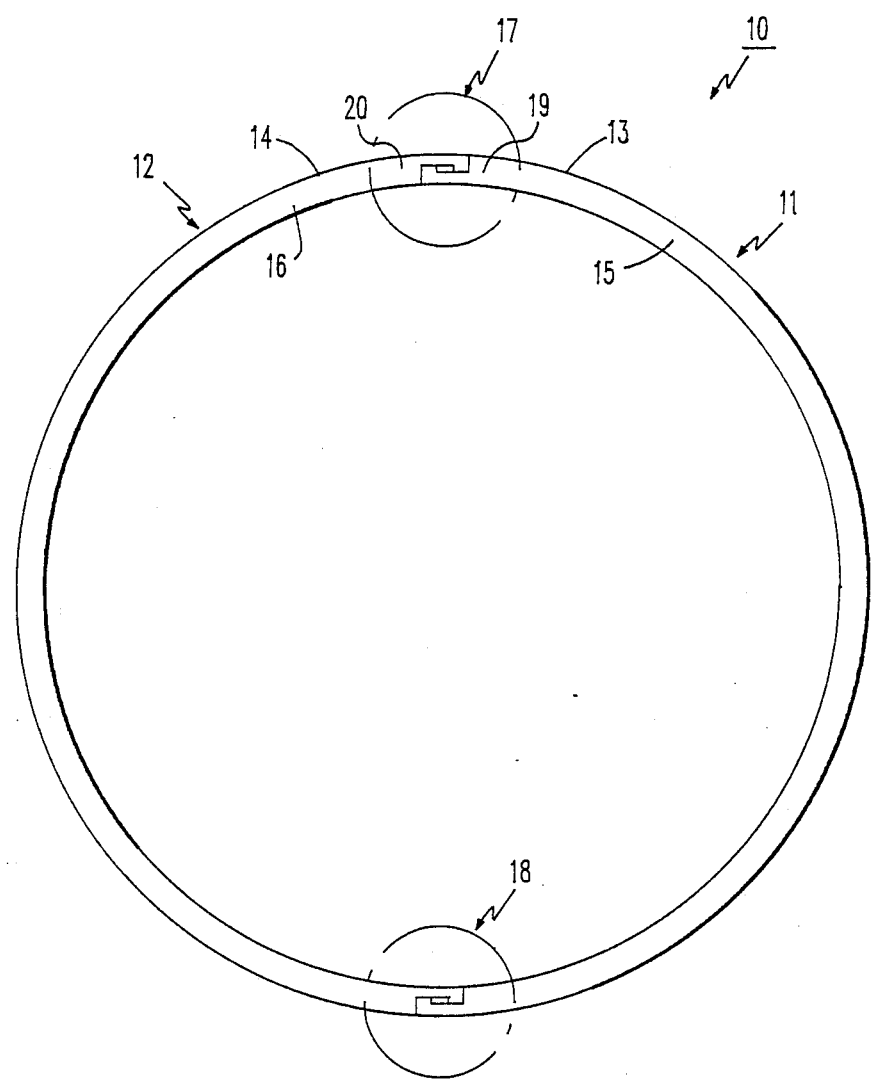
FIG. 1 a side view of a rotary combustor tire assembly which employs a tire joint according to an embodiment of the resent invention.

FIG. is a side view of a tire assembly employing a tire joint of an embodiment of the present invention. As shown in FIG. 1, the tire assembly 10 includes two substantially semicircular tire sections 11 and 12. It will be understood, however, that the joint assembly of the present invention may be used on a tire assembly which includes more than two tire sections. Each tire section 11 and 12 is provided with a rolling surface 13 and 14, respectively, and a thrust surface 15 and 16, respectively. The rolling surfaces 13 and 14 comprise the outer peripheral surface of the tire formed by joined tire sections 11 and 12. The thrust surfaces 15 and 16 comprise a side face of the tire formed by joined tire sections 11 and 12.

The two tire sections 11 and 12 are joined by two similar joints 17 and 18 to form a substantially circular-shaped tire assembly. Upon joining the two tire sections 11 and 12, the rolling surface 13 of the tire section 11 aligns with the rolling surface 14 of the tire section 12, and the thrust surface 15 of the tire section 11 aligns with the thrust surface 16 of the tire section 12. As shown in FIG. 1, the joint 17 joins the tire section end 19 of the tire section 11 with the tire section end 20 of the tire section 12. An enlarged detail view of the joint 17 is shown in FIG. 2.

Figure 2:
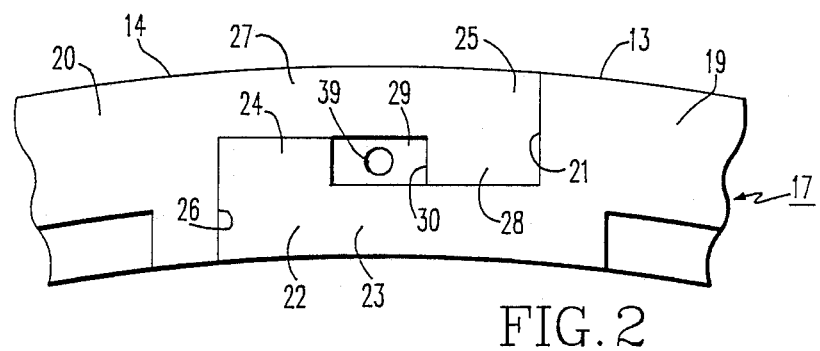
FIG. 2 is an enlarged detail view of the joint of FIG. 1.

Referring to FIG. 2, the tire section end 19 is provided with the rolling surface 13, and the tire section end 20 is provided with the rolling surface 14. The tire section end 19 has an end surface 21 extending substantially perpendicular to the rolling surface 13 and downward with respect to FIG. 2. A substantially hook-shaped member 22 extends from the tire section end 19 toward the tire section end 20. The substantially hook-shaped member 22 includes an arm 23 which extends from the first end 19, substantially parallel to the rolling surfaces 13 and 14 and substantially perpendicular to the end surface 21. The hook-shaped member 22 further includes an upward (with respect to FIG. 2) extending hook head 24, provided at the free end of the arm 23.

Also shown in FIG. 2 is a hook-shaped member 25 extending from an end surface 26 of the tire section end 16. The end surface 26 extends upward (with respect to FIG. 2) from the inside radius of the tire section end 20. The hook-shaped member 25 extends from the end surface 26 and is shaped similar to, but is oriented opposite, the hook-shaped member 22. The hook-shaped member 25 is provided with an arm 27 extending substantially parallel to the rolling surface of the tire section end 20, substantially perpendicular to the end surface 26. The upper surface (with respect to FIG. 2) of the hook-shaped member 25 forms part of the rolling surface 14. Extending downward (with respect to FIG. 2) from the free end of the arm 27 is a hook head 28.

Figure 3:
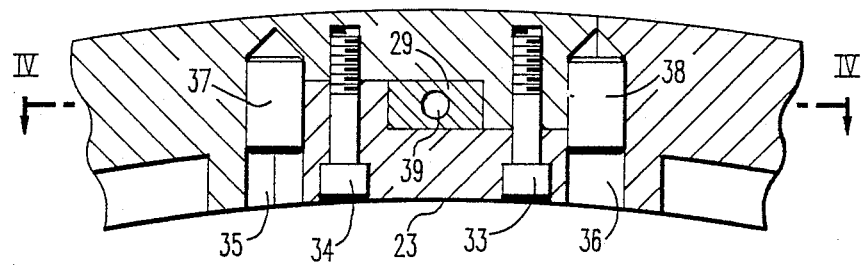
FIG. 3 is a cross-sectional view, taken along section A—A of FIG. 4, of a joint according to FIG. 2.

When joining the tire section 11 with the tire section 12, the hook-shaped members 22 and 25 are positioned in an overlapping arrangement as shown in FIGS. 2 and 3. In this arrangement, the free end of the arm 27 and the head 28 abut the end surface 21 of the tire section 11 and the free end of the arm 23 and the head 24 abut the end surface 26 of the tire section 12. The rolling surfaces 13 and 14 of the tire sections 11 and 12, respectively, are arranged to align with each other upon joining of the tire section end 19 with the tire section end 20. Additionally, the thrust surfaces 15 and 16 of the tire sections 11 and 12, respectively, are also arranged to align with each other upon joining of the tire section ends 19 and 20. A gap is formed between the arms 23 and 27 and between the hook heads 24 and 28 of the hook-shaped members 22 and 25. An insert 29 is shaped to fit in and fill up the gap between the hook-shaped members 22 and 25.

Figure 4:
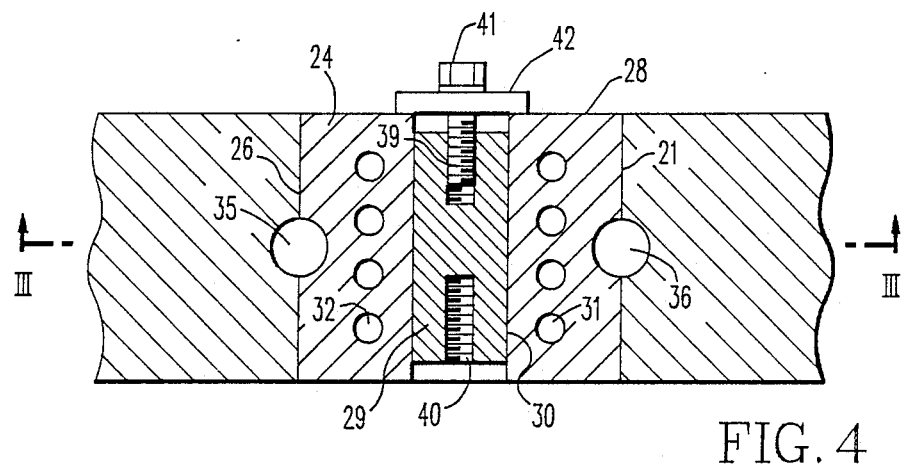
FIG. 4 is a cross-sectional view, taken along section B-B of FIG. 3, of the joint of the FIG. 3 embodiment.

As shown in FIG. 4, an edge 30 of the hook head 28 which abuts the insert 29 may be tapered so that a wedge-shaped gap is formed between the hook-shaped members 22 and 25. Similarly, the insert 29 may be tapered on the side which abuts the surface 30. In this manner, the insert 29 may be wedge-shaped so as to snugly fit within the wedge-shaped gap formed between the hook-shaped members 22 and 25.

In the embodiment of FIGS. 3 and 4, a first row of four bolt holes 31 extends through the arm 23 and aligns with a similar row of holes provided in the hook head 28. A second row of four bolt holes 32 is provided through the hook head 24 and aligns with a similar row of holes provided in the arm 27 The bolt holes 31 are shaped to receive bolts 33 (shown in FIG. 3) and the bolt holes 32 are shaped to receive bolts 34 (also shown in FIG. 3). As best shown in FIG. 4, the first row of bolt holes 31 is arranged adjacent one side of the insert 29, while the second row of bolt holes 32 is arranged adjacent the opposite side of the insert 29.

Two elongated dowel apertures 35 and 36 are shown in FIGS. 3 and 4. The dowel apertures 35 and 36 are made in the tire assembly following the initial manufacture of the tire sections 11 and 12 and the initial machining of the roller and thrust surfaces The dowel apertures 35 and 36 are substantially cylindrical shaped and have substantially circular cross sections The cross section of a length portion of the dowel aperture 35 is bifurcated by the end face 26 of the tire section 12. In this regard, approximately one-half of the bifurcated portion of dowel aperture 35 is formed, as a channel having a semicircular cross section, in the tire section end 20, while the second half of the bifurcated portion of dowel aperture 35 is formed, as a channel having a semicircular cross section, in the hook head 24 of the hook-shaped member 22 As shown in FIG. 3, a second length portion of the dowel aperture 35 extends into the arm 27 as a substantially cylindrical shaped hole.

The elongated dowel aperture 36 includes a length portion which extends through the arm 23 as a substantially cylindrical shaped hole. A second length portion of the elongated dowel aperture 36 has a substantially circular cross section which is bifurcated by the end face 21 of the tire section 11. The second length portion of the dowel aperture 36 is formed by a first channel provided in the end face 21 and a second channel provided in the hook head 28, each channel having a semicircular cross section.

As shown in FIG. 3, first and second alignment dowels 37 and 38 are adapted to snugly fit within the respective alignment dowel apertures 35 and 36 when the two tire sections 11 and 12 are aligned with respect to each other. Upon insertion of the alignment dowels 37 and 38 into the alignment dowel apertures 35 and 36, proper alignment between the respective roller surfaces 13 and 14 and between the respective thrust surfaces 15 and 16 of the tire sections 11 and 12 is insured.

Also shown in the FIG. 3 and 4 embodiment are apertures 39 and 40 provided in opposite ends of the insert 29. A retaining member 41 (such as a threaded bolt) is adapted to fit into the aperture 39 of the insert 29 and be secured to the insert 29 (i.e., by means of threads provided in the aperture 39). The wedge retaining member 41 is provided with a shoulder portion 42 (such as a washer) which, upon insertion of the retaining member 41 into the aperture 39, extends over one side of each of the hook-shaped members 22 and 25. In this manner, the insert 29 can be retained between the hook-shaped members 22 and 25. While not shown in FIG. 4, a similar retaining member may be inserted into the aperture 40 so as to provide a grip for extracting the insert 29.

In operation, the hook-shaped members 22 and 25 are arranged to overlap each other. When in an overlapping arrangement, the head 24 and the free end of arm 23 of the hook-shaped member 22 abut the end face 26 of the tire section 12, the head 24 abuts the arm 27 of the hook-shaped member 25, the head 28 and the free end of arm 27 of the hook-shaped member 25 abut the end face 21 of the tire section 11, and the head 28 abuts the arm 23 of the hook-shaped member 22. The insert 29 is then inserted within a gap formed between the hook-shaped members 22 and 25 so as to remove all clearances. The insert 29 may be provided with a tapered side, and the face of the hook-shaped member 25 which abuts the tapered side of the insert 29 may be similarly provided with a taper. Retaining or extracting members 41 fit into apertures provided on either side of the insert 29. The alignment dowels 37 and 38 are inserted into the alignment dowel apertures 35 and 36. The dowels 37 and 38 are provided at the interfaces of the tire sections 11 and 12 so as to insure a precise alignment of the rolling and thrust surfaces of the tire sections 11 and 12. The first row of bolts 33 and the second row of bolts 34 are inserted and secured within the first row of bolt holes 31 and the second row of bolt holes 32, respectively.

As a result, a rigid joint is formed between the tire sections 11 and 12. Tension and compressive loads exerted on the tire 10 are transferred through the insert 29 of the joint assembly 17. In this manner, the joint assembly 17 can accommodate a relatively high degree of tension and compressive forces.

Furthermore, the joint assembly 17 is relatively easy to assemble and disassemble.

Moreover, the joint assembly 17 insures and maintains a precise alignment of the rolling and thrust surfaces of the tire sections 11 and 12.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A joint assembly for connecting together the end of a first tire section with the end of a second tire section, the assembly comprising:

a first hook-shaped member having a first arm extending from the end of the first tire section and a first hook-head extending from said first arm;

a second hook-shaped member having a second arm extending from the end of the second tire section and a second hook-head extending from said second arm;

wherein said first and second hook-shaped members are adapted to be positioned in an overlapping arrangement with said first hook-head abutting said second arm and the end of the second tire section, said second hook-head abutting said first arm and the end of the first tire section, and said first and second hook-shaped members forming a gap between said first and second hook-heads and said first and second arms;

an insert member shaped to fit into said gap formed between said first and second hook-heads and said first and second arms; and securing means for securing said first and second hook-shaped members together in the overlapping arrangement.

2. An assembly as claimed in claim 1, further comprising:

alignment means for aligning the first and second tire sections upon positioning said first and second hook-shaped members in the overlapping arrangement;

wherein each of the first and second tire sections is provided with a rolling surface and a thrust surface and said alignment means aligns said rolling surface of the first tire section with said rolling surface of the second tire section and said thrust surface of the first tire section with said thrust surface of the second tire section.

3. An assembly as claimed in claim 2, wherein said alignment means comprises a first and a second alignment dowel.

4. A joint assembly for connecting together the end of a first tire section with the end of a second tire section, the assembly comprising:

a first hook-shaped member having a first arm extending from the end of the first tire section and a first hook-head extending from said first arm;

a second hook-shaped member having a second arm extending from the end of the second tire section and a second hook-head extending from said second arm;

wherein said first and second hook-shaped member are adapted to be positioned in an overlapping arrangement with said first hook-head abutting said second arm and the end of the second tire section, said second hook-head abutting said first arm and the end of the first tire section, and said first and second hook-shaped members forming a gap between said first and second hook-heads and said first and second arms;

an insert member shaped to fit into said gap formed between said first and second hook-heads and said first and second arms;

securing means for securing said first and second hook-shaped members together in the overlapping arrangement;

alignment means for aligning the first and second tire sections upon positioning said first and second hook-shaped members int he overlapping arrangement, said alignment means comprising a first and a second alignment dowel;

wherein each of the first and second tire sections is provided with a rolling surface and a thrust surface and said alignment means aligns said rolling surface of the first tire section with said rolling surface of the second tire section and said thrust surface of the first tire section with said thrust surface of the second tire section;

wherein the end of the firs tire section is provided with a first channel;

wherein said second hook-head is provided with a second channel;

wherein said first and second channels are arranged to form a first elongated aperture upon said second hook-head being positioned to abut the end of the first tire section;

wherein the end of the second tire section if provided with a third channel;

wherein said first hook-head is provided with a fourth channel;

wherein said third and fourth channels are arranged to form a second elongated aperture upon said first hook-head being positioned to abut the end of the second tire section; and wherein said first alignment dowel is shaped to fit in said first elongated aperture and said second alignment dowel is shaped to fit in said second elongated aperture.

5. An assembly as claimed in claim 1 wherein said securing means comprises:

first connecting means for connecting said first hook-head with said second arm; and second connecting means for connecting said second hook-head with said first arm.

6. An assembly as claimed in claim 5 wherein:

said first hook-head is provided with a first plurality of bolt holes;

said second arm is provided with a second plurality of bolt holes arranged to align with said first plurality of bolt holes upon said first and second hook-shaped members being positioned in the overlapping arrangement;

said second hook-head is provided with a third plurality of bolt holes;

said first arm is provided with a fourth plurality of bolt holes arranged to align with said third plurality of bolt holes upon said first and second hook-shaped members being positioned in the overlapping arrangement;

said first connecting means comprises a first plurality of bolts, each bolt being adapted to fit within one of said aligned first and second bolt holes; and said second connecting means comprises a second plurality of bolts, each bolt being adapted to fit within one of said aligned third and fourth bolt holes.

7. An assembly as claimed in claim 1, wherein:

said second hook-head is provided with a tapered side which abuts said insert member upon fitting the insert member into said gap formed between said first and second hook heads; and said insert member is provided with a tapered side which abuts said tapered side of said second hook-head upon fitting said insert member into said gap formed between said first and second hook-heads.

8. An assembly as claimed in claim 1, further comprising:

retaining means for retaining said insert member in said gap formed between said first and second hook-heads.

9. A tire joint assembly for joining together a first tire section and a second tire section of a rotary combustor tire, the tire joint assembly comprising:

a first member extending from the first tire section and adapted to abut the second tire section;

a second member extending from the second tire section and adapted to abut the first tire section at the same time that said first member abuts the second tire section, said second member further being shaped to form a gap between said first and second members upon said first and second members abutting the second and first tire sections, respectively;

an insert member for fitting into said gap formed between said first and second members; and securing means for securing said first and second members upon said first and second members abutting the second and first tire sections, respectively.

10. A tire joint assembly as claimed in claim 9 further comprising:

alignment means for aligning the first and second tire sections upon said first and second members abutting the second and first tire sections, respectively.

11. A tire joint assembly for joining together a first tire section and a second tire section of a rotary combustor tire, the tire joint assembly comprising:

a first member extending from the first tire section and adapted to abut the second tire section;

a second member extending from the second tire section and adapted to abut the first tire section at the same time that said first member abuts the second tire section, said second member further being shaped to form a gap between said first and second members upon said first and second abutting the second and first tire sections, respectively;

an insert member for fitting into said gap formed between said first and second members;

securing means for securing said first and second members upon said first and second member abutting the second and first tire sections, respectively; and alignment means for aligning the first and second tire sections upon said first and second members abutting the second and first tire sections, respectively;

wherein the first tire section has an end face provided with a first channel;

wherein said second tire section has an end face provided with a second channel;

wherein the second tire section has an end face provided with a third channel;

wherein said first member has an end face provided with a fourth channel;

wherein upon said first member abutting the second tire section, said third and fourth channels abut to form a first elongated aperture;

wherein upon said second member abutting the first tire section, said first and second channels abut to form a second elongated aperture; and wherein said alignment means comprises first and second alignment dowels shaped to fit into said first and second elongated apertures, respectively.

12. A tire joint assembly as claimed in claim 9, wherein said securing means comprises connecting means for connecting said first member with said second member.

13. A tire joint assembly as claimed in claim 12, wherein:

said first member is provided with a first and second plurality of bolt holes;

said second member is provided with a third and fourth plurality of bolt holes, said third plurality of bolt holes being positioned to align with said first plurality of bolt holes and said fourth plurality of bolt holes being positioned to align with said second plurality of bolt holes upon said first and second members abutting the second and first tire sections, respectively; and said connecting means comprises a first plurality of bolts arranged to fit into said aligned first and third plurality of bolt holes and a second plurality of bolts arranged to fit into said aligned second and fourth plurality of bolt holes.

14. A tire joint assembly as claimed in claim 9, wherein:

said second member is shaped to form a substantially wedge-shaped gap between said first and second members upon said first and second members abutting the second and first tire sections, respectively; and said insert member is substantially wedge-shaped.

15. A tire joint assembly as claimed in claim 9, further comprising:

retaining means for retaining said insert member in said gap formed between said first and second members.

* * * * *